United States Patent

[11] 3,583,362

[72] Inventors Hermann Trattner;
Erich Leibhard, both of Munich, Germany
[21] Appl. No. 769,578
[22] Filed Oct. 22, 1968
[45] Patented June 8, 1971
[73] Assignee Siemens Aktiengesellschaft
Berlin and Munich, Germany
[32] Priority Oct. 24, 1967
[33] Germany
[31] P 16 21 346.0

[54] COATING APPARATUS
3 Claims, 1 Drawing Fig.

[52] U.S. Cl. .......... 118/401, 222/189
[51] Int. Cl. .......... B05c 3/00
[50] Field of Search .......... 118/401, 410, 411, 200, 264, 266; 117/120; 222/394, 373 Inq.; 228/35, 43

[56] References Cited

UNITED STATES PATENTS

| | | | |
|---|---|---|---|
| 2,368,520 | 1/1945 | Burckhardt et al. .......... | 118/401 |
| 3,076,324 | 2/1963 | Morgan .......... | 118/48X |
| 3,356,066 | 12/1967 | Larsson et al. .......... | 118/401X |

*Primary Examiner*—Morris Kaplan
*Attorneys*—Curt M. Avery, Arthur E. Wilford, Herbert L. Lerner and Daniel J. Tick

ABSTRACT: A device for coating electric conductor plates with a solder layer comprised of tin or a tin alloy which comprises at least one roller-shaped solder holder comprised of wire gauze, embedded into the bottom side of a heatable solder container. The solder holding members are connected with the solder bath by ducts. A plate receiver is used for passing the conductor plates beneath the solder holder(s) and by brushing the plates against the holder(s).

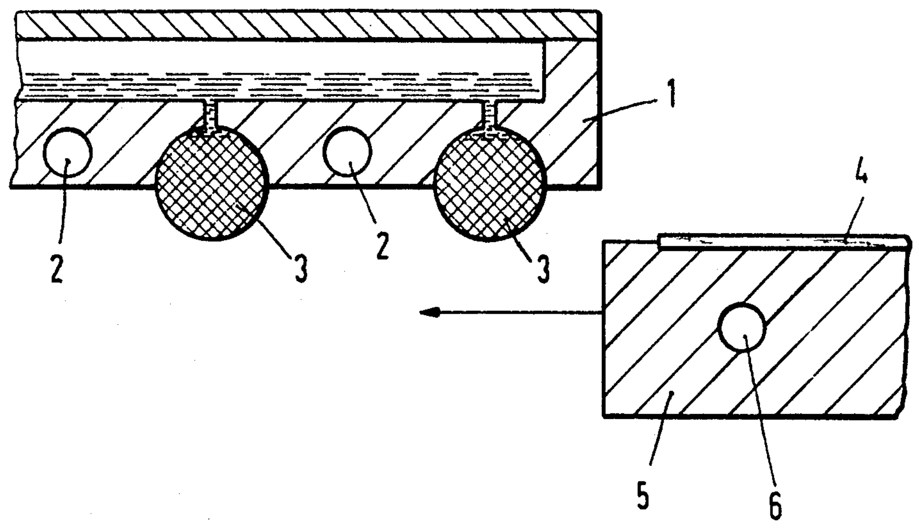
1
2
3
2
3
4
5
6

COATING APPARATUS

The invention relates to a device for coating the conductor leads of electric conductor plates with a solder layer of tin or tin alloy.

To facilitate and speed up the soldering process, primarily in automatic rapid soldering processes and to afford a permanent solderability of etched conductor plates, even when following prolonged storage, the conductor leads of the conductor plates are provided with a coating of pure tin or tin alloy. The purpose of the soldered coating is only satisfactorily fulfilled if the coating does not fall below a certain minimum thickness. This minimum thickness is about 7 micrometers (microns). Such tin layers cannot be produced, for example, with the known immersion baths or by means of hot tinning according to the roller or centrifugal process.

By employing the device of the present invention, layer thicknesses of up to 80 micrometers may be obtained for the solder cover in a single working step. The device is characterized according to the invention by having installed into the lower side of a heatable solder container, one or more roller-shaped solder holding bodies of wire gauze which are connected with the solder bath through ducts and a plate receiver by which the conductor plates are passed below the solder holders and brushed against them. Preferably, the solder holders, which by means of molecular forces prevent the solder from dripping, are produced of a plurality of very thin wires comprised of a material which is wettable by the solder but not soluble therein and which is loosely assembled and held by a wire mesh.

The drawing shows, in greater detail, an embodiment of the invention.

In the FIGURE, the rectangular solder container 1 is so heated by heating rods 2 so that the solder in the container is kept at a temperature of about 260° C. The solder holders 3 are embedded at the bottom side of the solder container 1, and are in contact with the solder bath by means of ducts. The solder holders 3 are roller-shaped and, in the tested device, have a diameter of approximately 20 mm. and a length of 10 mm. In one embodiment the wire holders were fashioned from a coil of very fine wire gauze, comprised of nickel-chromium wire, while in another embodiment they are made of loosely assembled fine wires of the same material, held together by a fine wire gauze.

For hot-tinning, a conductor plate 4 is placed into the plate receiver 5. The plate receiver 5 is preheated through heating rods 6, to about 100° C. The plate receiver 5 is passed as indicated by the arrow, below the solder container 1 by a drive not shown, along guide bars, also not shown, whereby the conductor plate 4 brushes against several solder holdings 3. Arranging several solder holders 3 at the lower side of the solder container 1 affords the possibility of compensating for any bulge in the conductor plate 4. The layer thickness of the solder upon conductor plate 4 is influenced by the speed at which the plate traverses the solder holders and by the number of solder holdings 3. For example, if the plate passed at a rate of 3 m. per second a total of 2 rod holders of 20 mm. diameter using a pure tin bath at 260° C. a layer of $10\mu$ is produced. In many cases it may be advantageous to use a low melting tin allow instead of pure tin, for example an alloy containing 60 percent by weight tin and 40 percent by weight lead.

We claim:

1. A device for coating electric conductor plates with a tin solder layer which comprises a heatable solder container, at least one roller-shaped solder holder comprised of wire gauze, embedded into the bottom side of said container, said solder holding member is connected with the solder bath by duct means and a plate receiver for holding conductor plates and passing said conductor plates beneath the solder holder while brushing said conductor plates against said holder and heater means in said plate receiver.

2. The device of claim 1, wherein the solder holders are comprised of a plurality of very thin wires of a material which is wettable by the solder but not soluble therein.

3. The device of claim 1, wherein the solder holders are comprised of a plurality of very thin loosely assembled wires held by a wire gauze and a material which is wettable by the solder but not soluble therein.